Figure 8:
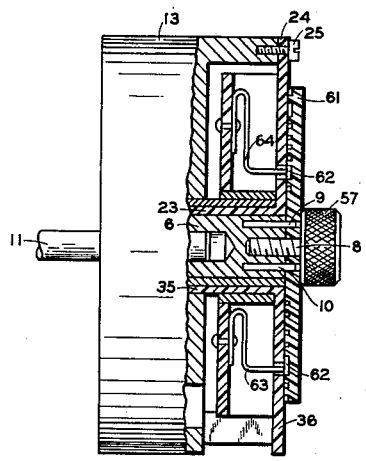

Dec. 25, 1962   R. BEGUIN   3,070,673
CONTROL DEVICE FOR SEWING MACHINE
Filed Nov. 5, 1958   2 Sheets-Sheet 1
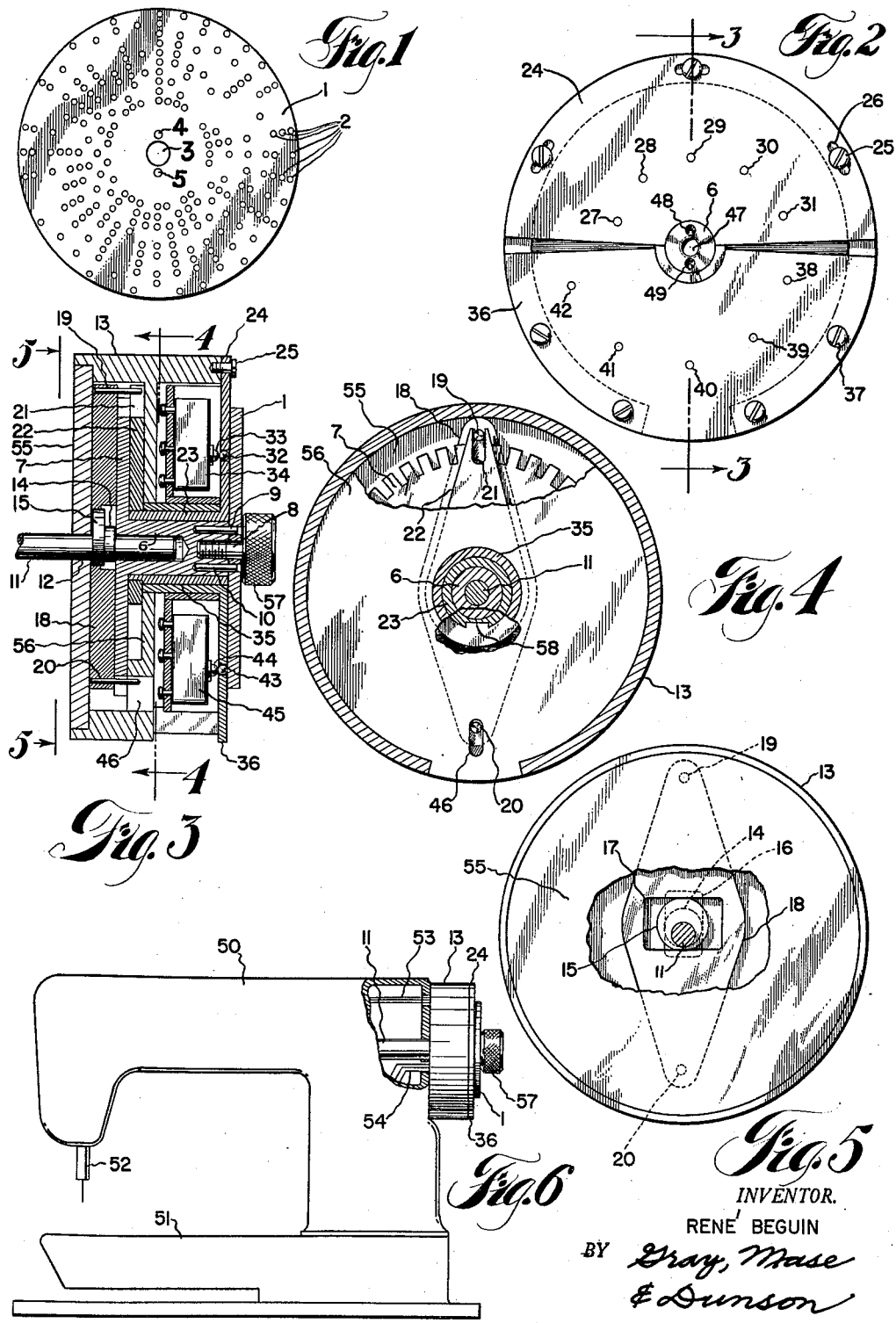
INVENTOR.
RENÉ BEGUIN
BY Gray, Mase
& Dunson
ATTORNEYS Dec. 25, 1962    R. BEGUIN    3,070,673
CONTROL DEVICE FOR SEWING MACHINE
Filed Nov. 5, 1958    2 Sheets-Sheet 2

INVENTOR.
RENE' BEGUIN
BY *Gray, Mase & Dunson*

ATTORNEY

United States Patent Office 3,070,673
Patented Dec. 25, 1962

3,070,673
CONTROL DEVICE FOR SEWING MACHINE
Rene Beguin, Geneva, Switzerland, assignor to Mefina S.A., Fribourg, Switzerland, a firm
Filed Nov. 5, 1958, Ser. No. 771,982
11 Claims. (Cl. 200—46)

This invention relates to a device for use on a sewing machine which forms diverse stitches and patterns automatically. More particularly, this invention provides a digital program and reading device for transmitting information contained in the digital program to the needle holder and fabric feeder, whereby each alternately receives information on each half rotation of the drive shaft of the sewing machine.

As is well known, digital programs are conventionally used to control automatic sewing machines. These programs include a series of groups of signals that are equal to one another. The arrangement of the signals in the group and the number of groups that can be transmitted to the parts of the machine within a given time determines the complexity of the pattern produced, the mechanical performance of the machine, and the amount of information that can be stored on a digital program.

The parts of the sewing machine to be controlled are the needle holder and the fabric feeder. Conventionally, the driving mechanism of most sewing machines requires control of the needle holder and fabric feeder to be accomplished during one revolution of the driving shaft of the machine so that the needle holder is controlled during one-half of the revolution and the fabric feeder during the other half of the revolution. Other driving mechanisms require that the program be read during a certain period of time. The process of reading a digital program is carried out by the relative motion of the program and reading device. Since each unit of information must occupy a certain amount of surface on the digital program, the amount of information or number of signals that a program of a given space can contain is conventionally limited. There is a disadvantage where the program is made into a disk or cam driven by rotation. The disadvantage, of course, consists of the limited number of stitches in a pattern. One of the advantages of this invention is in providing means to increase the units of information on a digital program and consequently the number of stitches in a pattern.

This invention differs from conventional devices for controlling automatic sewing machines, in that it includes an intermittent driving mechanism for the operation of the digital program by intermittent rotation. The reading device consists of two groups of readers. One group is stationary and the other group has an oscillatory movement. Both groups of readers perform their function when their motion relative to the digital program is at a standstill. Thus, the stationary group of readers takes information from the digital program during the standstill portion of the digital program's intermittent rotation, and the movable group of readers takes information from the digital program during the time the program is in motion.

To these and other ends, this invention comprises apparatus and a method of operating the same, a preferred form of which is disclosed in the following description and attached drawings. Although the apparatus, structure, and method described and shown in detail refer with particularity to a control mechanism for automatic sewing machines, it is apparent that this invention should not be limited thereto. The invention is applicable to control mechanisms of all types, when properly constructed, to utilize the advantages of this invention. The invention may be used for other purposes where its features are advantageous.

Figure 7:
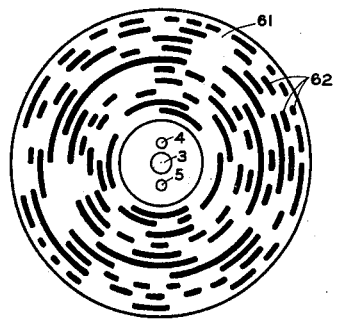
Figure 9:
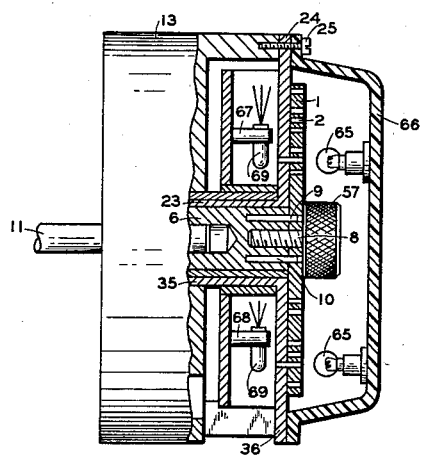

In the drawings:
FIG. 1 is a plan view of the digital program;
FIG. 2 is an elevational view of the control mechanism without the digital program and showing the reading device;
FIG. 3 is a sectional elevational view along the line 3—3 of FIG. 2 showing the reading device with mechanical readers;
FIG. 4 is a partially sectioned elevational view taken along the line 4—4 of FIG. 3;
FIG. 5 is a partially cut-away elevational view taken along the line 5—5 of FIG. 3;
FIG. 6 is a partially sectioned elevational view of a sewing machine in combination with the control device;
FIG. 7 is a plan view of another example of a digital program for use with readers having electrical contacts;
FIG. 8 is a sectional elevational view taken along the line 3—3 of FIG. 2 showing the reading device with electrical readers; and
FIG. 9 is a sectional elevational view taken along the line 3—3 of FIG. 2 showing the reading device with photoelectric readers.

Referring to FIG. 6, the machine includes an upper framework 50 and a lower framework 51 in which a needle holder 52 and a fabric feeder (not shown) are set, respectively. In the upper framework 50, there is also a shaft 11 driven by rotation means; for example, an electric motor (not shown). The shaft 11 rotates in a bearing in the upper framework 50 and in the wall 55 of the casing 13 joined with the framework (FIG. 3). On the shaft 11 there are two cams 14 and 15 that rotate in the openings 16 and 17, respectively, (FIG. 5) of a lever 18. At each end the lever 18 carries a projection 19 and 20. These projections 19 and 20 work together with the slots 21 and 46, respectively, and also in the slots around the periphery of an idler wheel 7 mounted on the shaft 11. The projection 20 fits into an opening 46 in the wall 56 of the casing 13. This opening 46 is a vertical slot that matches the slots of the wheel 7 as they turn and come past the opening 46. The hub 6 of the wheel 7 extending toward the disk 1 (FIGS. 2 and 3) has a central threaded bore 47 as well as two diametrically opposed bores 48 and 49 on each side of the central, threaded bore 47. At the end of the hub 6 is the disk 1 fastened by means of a milled head screw 57, with a threaded end 8, and two safety pins 9 and 10. The threaded end 8 goes through hole 3 and the pins 9 and 10 go through holes 4 and 5, respectively, of disk 1. In the disk 1 are ten rows of holes, 2 bored only part way through, and arranged concentrically around the center of the disk. The holes 2 make up the digital program.

The end of the projection 19 fits into the slot 21 (FIGS. 3 and 4). The slot 21 is on the end of the lever 22 which moves the sleeve 23 by means of the key slot 58. The sleeve 23 is a part of the half disk 24 adjacent to the disk 1. The rocking of the lever 22 axially displaces the sleeve 23 and half disk 24. The axial displacement of the half disk 24 is limited by fastening means passing through the oblong holes 26, such as screws 25, which are threadedly engaged in the housing 13. The half disk 24 contains a plurality of holes 27, 28, 29, 30 and 31 at different radial distances from the axis of the half disk 24. The radial distance of the holes 27 through 31 correspond to the radial distances of the first five rows of the holes 2 on the disk 1 starting from the center of the disk 1. A reader 32 fits into each of the holes 27, 28, 29, 30 and 31. The readers 32 (as shown in FIG. 3) are small balls exerting a pressure against the disk 1 by means of pushers 33 attached to the microswitches 34. The microswitches 34 are, in turn, attached to the half disk 24.

The lever 22, sleeve 23, half disk 24, readers 32, and microswitches 34 make up a mobile reading device to read the program contained on the disk 1 as it rotates.

The microswitches 34 are connected by wires 53 (FIG. 6) to control means such as electromagnets (not shown) which serve to control lateral displacement of the needle holder.

The stationary reading device, which reads the program contained on disk 1 while it is standing still, includes a sleeve 35 surrounding the sleeve 23 connected to a half disk 36 adjacent to the disk 1. The half disk 36 is attached to the housing 13 by fastening means, such as screws 37. The radial distances of holes 38, 39, 40, 41 and 42 in the half disk 36 correspond to the radial distances of the last five rows of the holes 2 on the disk 1, starting from the center of the disk 1. A reader 43 fits into each of the holes 38, 39, 40, 41 and 42. The readers 43 (as shown in FIG. 3) are small balls exerting a pressure against the disk 1 by means of pushers 44 attached to the microswitches 45. The microswitches 45 are, in turn, connected to the half disk 36. The wires 54 (FIG. 6) connect the microswitches 45 to control means such as electromagnets (not shown) which serve to control the displacement of the fabric feeder.

The control device described above operates as follows:

The disk 1 containing the digital program to be communicated to the sewing machine in order to form a pattern is rotated intermittently by means of the self-locking driving mechanism.

When the wheel 7 is at rest (as shown in FIG. 4), the locking pin 20 fits into one of the slots on the wheel 7, whereas the driving pin 19 is outside of any of the slots on the wheel 7. Since the disk 1 containing the digital program is attached to the hub 6 of the wheel 7, the disk 1 is also at rest. The rotation of the shaft 11, for instance, in a clockwise direction, as when viewing the device as pictured in FIG. 5, brings about the displacement of different parts in the following manner.

The cam 14 rotating clockwise in the opening 16 pushes against the right edge of the opening (FIG. 5) and displaces the lever to the right. The pin 20 which fits into the slot 46 rotates in this opening and thus forms the pivot point for the lever 18. The cam 15 rotating clockwise in the opening 17 then pushes against the lower edge of the opening 17 and displaces the lever 18 downward. This results in the pin 19 entering a slot of the wheel 7 and the pin 20 leaving a slot of the wheel 7. Cam 14 continues to rotate until it pushes on the left side of the opening 16 moving the lever 18 to the left. This results in a displacement of the wheel 7 in a counterclockwise direction since the pin 19 is engaged in a slot of the wheel 7. Cam 15 continues to rotate and pushes against the upper edge of the opening 17 causing an upward displacement of the lever 18. Then 19 thus becomes disengaged from the slot on wheel 7 and pin 20 reengages a slot on wheel 7 and locks wheel 7 in its new position.

Thus, it can be seen that, while the shaft 11 makes one revolution, the cams 14 and 15 acting in openings 16 and 17, respectively, have caused two different oscillatory motions of the lever 18. The shape of the cams 14 and 15 and the openings 16 and 17 is preselected so that the meshing of the cam 14 and opening 16 produces a horizontal motion of the lever 18, which corresponds to the spacing of the slots on the wheel 7, and the meshing of the cam 15 in the opening 17 produces a vertical movement in excess of the depth of the slots of the wheel 7. As a consequence, the driving pin 19 describes an elliptical trajectory for each revolution of the shaft 11. The large axis of the ellipse is in the direction of the radius of the wheel 7 and its small axis is tangential to the wheel 7. On the other hand, the locking pin 20 which moves in the opening 46 has a linear movement as directed by the opening 46 and is in the direction of the radius of the wheel 7.

Thus, the wheel 7 is in motion during half a revolution of the shaft 11 and stopped and locked during the following half revolution. The same thing holds true for the disk 1 containing the digital program, since it is connected to the hub 6 of the wheel 7. The distance between the slots on the wheel 7 is selected so that the angular displacement of the disk corresponds to the smallest angle between two of the holes 2 in the same concentric row of disk 1.

The driving pin also projects into the slot 21 so that the lever 22 moves at the same time and in the same direction as wheel 7 and is moved opposite to the rotational direction of wheel 7 while wheel 7 is locked in position. As a result, the mobile group of reading devices including the sleeve 23, the half disk 24, the microswitches 34, and the readers 32 follows the disk 1 in its motion and returns or moves opposite to the usual rotation of disk 1 when the disk 1 is standing still.

During the movement of the disk 1, a reader 32 is engaged in a hole 2 under the pressure of the pusher 33 and reads information provided by whatever hole is present in that particular area of the disk. The information is communicated by means of the respective microswitches to the control mechanism of the needle holder. During the time that the reader 32 is gathering information from the disk 1, none of the readers 43 of the stationary groups are engaged in any of the holes 2 since the disk 1 is in motion. Consequently, no information is being imparted to the control mechanism of the fabric feeder.

During the following half revolution of the shaft 11, the disk 1 is at rest. The reader 32 leaves the hole 2 and returns to seek new information. At the same time, the disk 1, being at rest, a reader 43 is engaged in a hole 2 under pressure of the pusher 44 and reads information provided by whatever hole 2 is present in that particular area of the disk. The information is communicated by means of the respective microswitch 45 to the control mechanism of the fabric feeder.

As can be seen from the preceding description, the disk 1 which makes up the digital program is intermittently rotated due to the intermittent driving mechanism of the control device according to this invention. Thus the reading device according to this invention allows the digital program to be read by one group of readers while the program is in motion and another group of readers while the program is at a standstill. So that in both instances the relative motion of the digital program and readers is zero during the time information is being read.

This invention then allows the digital program to contain a great amount of information so that patterns of numerous stitches may be produced.

FIG. 7 shows a disk 61 made of insulating material having strips of conducting material 62 arranged in ten rows similar to the holes 2 of the disk 1 shown in FIG. 1. The disk 61 is fitted to the reading device of FIG. 8 and fastened in place by the milled head screw 57, and the two safety pins 9 and 10. The pattern of the conducting material 62 can, of course, be varied according to the stitch pattern desired. The half disks 24 and 36 of the reading device shown in FIG. 8 are made of an insulating material. A stationary reader 63 fits into each of the holes 38, 39, 40, 41, and 42. Similarly, a mobile reader 64 fits into each of the holes 27, 28, 29, 30, and 31. The essential difference between the reading device of FIG. 8 and FIG. 3 is that, instead of the readers being sensitive to holes in the digital program, the readers 63 and 64 are electrical contacts and engagement with the conducting strips 62 closes a circuit to activate the controls of the machine.

Another example of a reading device is shown in FIG. 9 and activates the machine by photoelectric means. The mechanical action of the disk 1 and half disk 24 are the same as that of the reading device of FIG. 3. A plurality of light sources 65—65 are mounted on a base 66 attached by screws 25 and 37 to the housing 13. The mobile readers 67 and 68 are photoelectric cells 69. When the holes 2 of the disk 1 are aligned with the holes 27—31 and 38—42, the light strikes the photoelectric cells and thereby activates the controls of the machine. The holes 2 of the disk 1 may be filled with a translucent or transparent material.

It will be understood, of course, that, while the forms of the invention herein shown and described, constitute the preferred embodiments of the invention, it is not intended to illustrate all the possible forms or ramifications of the invention. It will also be understood that the words used are words of description rather than words of limitation and various changes such as changes in shape size and arrangement of parts may be substituted without departing from the spirit and scope of the invention herein disclosed.

What is claimed is:

1. A control device for a sewing machine comprising: a disk containing a digital program; a lever activated by the drive shaft of said sewing machine and positioned to engage and drive a slotted wheel connected to said disk and intermittently rotating said program; a stationary group of readers and a mobile group of readers for receiving and transmitting information from said program to the machine, said mobile readers being attached to a mobile half disk.

2. A control device for a sewing machine comprising: a disk containing holes to make up a program; a lever activated by the drive shaft of said sewing machine and positioned to engage and drive by two oscillatory motions, a slotted wheel connected to said disk and intermittently rotating said program; a stationary group of readers and a mobile group of readers for receiving and transmitting information from the program to the machine, said mobile readers being attached to a mobile half disk.

3. A control device for a sewing machine comprising: a disk containing holes to make up a program; a lever activated by the drive shaft of said sewing machine positioned to engage and drive by two oscillatory motions, a slotted wheel connected to said disk and intermittently rotating said program; a stationary group of readers and a mobile group of readers each group having pressure means adapted to detect holes in said program for receiving and transmitting information from said program to the machine; said mobile readers being attached to a mobile half disk displaced during a half revolution of the sewing machine drive shaft at the same time, in the same direction, and to the same angular distance as the said disk containing said program and returned in the opposite direction during the following half revolution of said drive shaft.

4. A control device for a sewing machine comprising: a disk having holes arranged in concentric rows to make up a program; a lever activated by the drive shaft of said sewing machine with a driving pin and a locking pin to engage and drive by two oscillatory motions perpendicular to each other, a slotted wheel connected by means of a hub to said disk and intermittently rotating said program; a stationary group of readers and a mobile group of readers having a microswitch with a small ball to fit into the holes of said program for receiving and transmitting information from said program to the machine; said mobile readers being attached to a mobile half disk and said mobile half disk being connected to and displaced by a second lever moved by one of said oscillations of said driving pin that is tangential to said slotted wheel.

5. A control device for a sewing machine having a rotating drive shaft comprising: a disk having electrical conducting and electrically insulated areas to make up a program; a plurality of cams on said drive shaft fitting into a plurality of openings in a lever; a driving pin and a locking pin on said lever to engage and drive by two oscillatory motions a slotted wheel connected to said disk and intermittently rotating said program whereby during one revolution of the sewing machine drive shaft the combined oscillatory motion of said driving pin follows an elliptical path with large axis of the ellipse directed along a radius of said slotted wheel and the small axis of the ellipse tangential to said slotted wheel and the trajectory of the locking pin is directed along a radius of said slotted wheel; said cams and opening in said lever selected so that the lever causes said slotted wheel to be displaced at an angular distance equal to the angular distance between two adjacent electrically conducting areas on said disk; a stationary group of readers and a mobile group of readers having electrical contacts to detect said electrical conducting areas of said program for receiving and transmitting information from said program to the machine; said mobile readers being attached by a mobile half disk and said mobile half disc being connected to and displaced by a second lever engaged and moved to said driving pin during the oscillatory motion that is tangential to said slotted wheel.

6. A control device for a sewing machine having a rotating drive shaft comprising: a disk having opaque and transparent areas to make up a program; a plurality of cams on said drive shaft fitting into a plurality of openings in a lever; a driving pin and locking pin on said lever to engage and drive by two oscillatory motions, a slotted wheel connected to said disk and intermittently rotating said program whereby during one revolution of the sewing machine drive shaft the combined oscillatory motion of said driving pin follows an elliptical path with the large axis of the ellipse directed along a radius of said slotted wheel and the small axis of the ellipse tangential to said slotted wheel and the trajectory of the locking pin is directed along a radius of said slotted wheel; said cams and openings in said lever selected so that the lever causes said slotted wheel to be displaced at an angular distance equal to the angular distance between two adjacent transparent areas on said program; a stationary group of readers and a mobile group of readers having photoelectric devices to detect said transparent areas of said program for receiving and transmitting information from said program to the machine; said mobile readers being attached to a mobile half disk and said mobile half disk being connected to and displaced by a second lever engaged and moved by said driving pin during the oscillatory motion that is tangential to said slotted wheel.

7. A control device for a sewing machine having a rotating drive shaft, comprising: a disk containing holes to make up a program of information; a lever having a driving pin and a locking pin, oscillated by cams on said drive shaft engaging openings on said lever; a slotted wheel rotatably supported in said device, engaged alternately by said pins and connected to said disk for imparting intermittent rotary motion thereto; a stationary group of readers contacting said holes for receiving and transmitting information from said disk to said machine during the stationary portion of said intermittent rotary motion; and a mobile group of readers rockably supported in said device and contacting said holes in said disk during the motion portion of said intermittent rotary motion for receiving and transmitting information from said disk to said machine.

8. A control device for a sewing machine comprising: disk means containing information through the position of indicia contained thereon; intermittently rotated by drive means in said machine; said intermittent motion comprising a dwell portion and a motion portion; stationary reader means on said control device oriented to receive and transmit information from the indicia of said disk during said dwell portion; and mobile reader means rockably supported in said device and adapted to detect the indicia on said disk during said motion portion; to provide information readout from said disk during both the dwell and motion portions of the intermittent motion cycle.

9. A control device for a machine having a drive shaft comprising: a disk containing holes to make up a program; a lever activated by said drive shaft positioned to engage and drive by two oscillatory motions, a slotted wheel connected to said disk and intermittently rotating said program; a stationary group of readers and a mobile group of readers for receiving and transmitting information from the program to the machine, and mobile readers being attached to a mobile half disk.

10. A control device for a machine having a rotating drive shaft comprising: a disk containing holes to make up a program; a lever activated by said drive shaft positioned to engage and drive by two oscillatory motions, a slotted wheel connected to said disk and intermittently rotating said program; a stationary group of readers and a mobile group of readers, each group having pressure means adapted to detect holes in said program for receiving and transmitting information from said program to the machine; said mobile readers being attached to a mobile half disk displaced during a half revolution of the drive shaft at the same time, in the same direction, and to the same angular distance as said disk containing said program and returned in the opposite direction during the following half revolution of said drive shaft.

11. A control device for a machine having a rotating drive shaft, comprising: a disk containing holes to make up a program of information; a lever having a driving pin and a locking pin, oscillated by cams on said drive shaft engaging openings on said lever; a slotted wheel rotatably supported in said device, engaged alternately by said pins and connected to said disk for imparting intermittent rotary motion thereto; a stationary group of readers contacting said holes for receiving and transmitting information from said disk to said machine during the stationary portion of said intermittent rotary motion; and a mobile group of readers rockably supported in said device and contacting said holes in said disk during the motion portion of said intermittent rotary motion for receiving and transmitting information from said disk to said machine.

References Cited in the file of this patent

UNITED STATES PATENTS

| | | |
|---|---|---|
| 1,296,634 | De Guire | Mar. 11, 1919 |
| 2,121,895 | Toward et al. | June 28, 1938 |
| 2,338,305 | Simmon | Jan. 4, 1944 |
| 2,410,295 | Kuehni et al. | Oct. 29, 1946 |
| 2,639,340 | Gaite | May 19, 1953 |
| 2,649,065 | Casper | Aug. 18, 1953 |
| 2,656,497 | Schweighofer et al. | Oct. 20, 1953 |
| 2,703,347 | Constantine | Mar. 1, 1955 |
| 2,803,207 | Sotzky | Aug. 20, 1957 |
| 2,820,913 | Christy | Jan. 21, 1958 |